(12) United States Patent
Moore

(10) Patent No.: US 12,728,904 B2
(45) Date of Patent: Sep. 8, 2026

(54) UTILITY CART

(71) Applicant: JS Products, Inc., Las Vegas, NV (US)

(72) Inventor: James Moore, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 348 days.

(21) Appl. No.: 18/218,494

(22) Filed: Jul. 5, 2023

(65) Prior Publication Data

US 2024/0010257 A1 Jan. 11, 2024

Related U.S. Application Data

(60) Provisional application No. 63/359,307, filed on Jul. 8, 2022.

(51) Int. Cl.
*B62B 3/08* (2006.01)
*B62B 3/00* (2006.01)
*B62B 5/06* (2006.01)

(52) U.S. Cl.
CPC ................ *B62B 3/08* (2013.01); *B62B 3/002* (2013.01); *B62B 5/067* (2013.01); *B62B 3/007* (2013.01); *B62B 2203/07* (2013.01); *B62B 2203/70* (2013.01)

(58) Field of Classification Search
CPC .............. B62B 3/08; B62B 1/24; B62B 5/067
See application file for complete search history.

(56) References Cited

U.S. PATENT DOCUMENTS 365,233 A 6/1887 Blake
413,566 A 10/1889 Schroder
437,885 A 10/1890 Bryant
583,373 A * 5/1897 Hill .......................... B60P 1/32 298/14
595,056 A 12/1897 French
677,971 A 7/1901 Fox
711,539 A 10/1902 Shope
764,309 A 7/1904 Shadbolt
(Continued)

FOREIGN PATENT DOCUMENTS

AU 2020217760 9/2021
AU 2020219049 9/2021
(Continued)

OTHER PUBLICATIONS

Notification of Transmittal of the International Search Report and the Written Opinion of the International Searching Authority, or the Declaration for PCT Patent Application No. PCT/US23/26945, mailed Nov. 14, 2023, 19 pages.

*Primary Examiner* — Emma K Frick
(74) *Attorney, Agent, or Firm* — Snell & Wilmer LLP

(57) ABSTRACT

A utility cart comprises a frame supported by first and second front wheels mounted for rotation about a front wheel axis and spaced apart by a first distance and first and second rear wheels mounted for rotation about a rear wheel axis and spaced apart by a second distance, and a bed mounted to the frame and configured for rotational movement between a transport position and a dumping position about a pivot axis, the pivot axis being located between the front wheel axis and the rear wheel axis, wherein the second distance is greater than the first distance and a width of the bed, whereby when the bed is moved to the dumping position the bed is located between the rear wheels.

15 Claims, 7 Drawing Sheets

(56) References Cited

U.S. PATENT DOCUMENTS 804,439 A 11/1905 Somerville
898,204 A 9/1908 Feller
1,293,640 A 2/1919 Fontaine et al.
1,529,479 A 3/1925 Furr
1,588,311 A 6/1926 Cooke
1,838,224 A 12/1931 Holloway
2,118,711 A 5/1938 McKinney
2,436,443 A * 2/1948 Meisenhelder ........... B60P 1/06 298/20 R
3,092,418 A 6/1963 Themascus
3,152,838 A 10/1964 Morehead
3,158,402 A 11/1964 Clement
3,604,753 A * 9/1971 Couture .................... B62B 1/24 298/3
4,789,171 A 12/1988 Porter
4,811,988 A 3/1989 Immel
5,350,030 A * 9/1994 Mawhinney .............. B62B 1/24 180/215
5,395,163 A 3/1995 Mandell et al.
5,474,416 A * 12/1995 Rogge .................. B62D 63/061 414/495
5,536,131 A * 7/1996 Behr ....................... B60P 1/025 296/25
6,659,565 B2 * 12/2003 Brant .................... B62B 5/0026 298/7
6,662,679 B2 * 12/2003 Hobdy ..................... B60D 1/14 74/548
6,802,516 B2 * 10/2004 Schuerman ........... B62B 5/0013 280/30
6,848,881 B2 * 2/2005 Henry ....................... B62B 3/08 414/469
6,851,756 B2 * 2/2005 Pieschel .................... B60P 1/04 298/17.8
D527,508 S 8/2006 Monteith et al.
7,210,697 B2 * 5/2007 Simpson ................... B62B 5/06 16/446
7,390,065 B2 6/2008 Pieschel et al.
D606,565 S 12/2009 Hickenbottom
7,818,865 B2 10/2010 Pieschel et al.
7,887,141 B2 2/2011 Pieschel et al.
D646,042 S 9/2011 Hatcher et al.
8,496,298 B2 7/2013 Martini et al.
D713,895 S 9/2014 Blumenthal
8,998,341 B2 * 4/2015 Dechant ................ B60P 1/6409 298/5
9,004,607 B1 4/2015 Martini et al.
9,056,573 B1 6/2015 Martini et al.
D754,414 S 4/2016 Lear
9,909,273 B2 * 3/2018 Al Adawi ................. E01H 5/02
9,931,970 B2 4/2018 Dechant
10,053,126 B2 8/2018 Buttimer
10,112,635 B1 * 10/2018 Jin ............................ B62B 3/08
10,272,815 B2 4/2019 De Ceuster
10,486,727 B2 11/2019 Dettner et al.
D897,679 S 10/2020 Foley et al.
D897,680 S 10/2020 Foley
D897,936 S 10/2020 Wernberg
D898,315 S 10/2020 Wernberg
11,299,187 B2 * 4/2022 Foley ......................... B62B 3/08
11,814,093 B2 * 11/2023 Lin ......................... B62B 5/061
11,897,530 B2 * 2/2024 Carlson ..................... B62B 3/02
12,030,545 B2 * 7/2024 Wernberg ............... B62B 5/067
12,221,148 B2 * 2/2025 Mendoza .................. B62B 1/12
12,397,696 B2 * 8/2025 Liu ......................... B60P 1/283
12,403,946 B2 * 9/2025 Liu ........................... B62B 3/04
2004/0046438 A1 3/2004 Stickel et al.
2005/0013683 A1 * 1/2005 Henry ....................... B62B 3/08 414/469
2005/0134012 A1 * 6/2005 Kan .......................... B62B 3/08 280/47.34
2006/0119164 A1 6/2006 Heskin
2014/0334904 A1 * 11/2014 Howell ..................... B60P 1/32 414/477
2017/0197674 A1 7/2017 Mitchell et al.
2020/0247198 A1 8/2020 Wernberg et al.
2020/0247447 A1 8/2020 Foley et al.
2021/0039698 A1 * 2/2021 Kato ......................... B62B 5/06
2021/0039701 A1 2/2021 Ifuku et al.
2021/0114642 A1 4/2021 Carlson et al.
2022/0194453 A1 6/2022 Foley et al.

FOREIGN PATENT DOCUMENTS

CA 12275 3/1939
CA 2503869 7/2005
CA 2590949 5/2007
CA 3129002 8/2020
CA 3129084 8/2020
CN 107697117 2/2018
CN 109398462 3/2019
CN 201930507120.4 6/2020
CN 118928520 A * 11/2024 ............... B62B 5/00
DE 29901968 4/1999
DE 20108700 8/2022
EP 252633 A2 1/1988
EP 2019028 3/2010
GB 180173 5/1922
GB 2434342 4/2011
KR 20120005799 U 8/2012
RU 180870 U1 6/2018
WO WO 2007/056246 5/2007
WO 2011114465 9/2011
WO WO 2020/163346 8/2020
WO WO 2020/163351 8/2020

* cited by examiner 24
20
70
52
26
44
28
22
36b
34a
34b
52
20
70
24
44
28

34b
36b

UTILITY CART

RELATED APPLICATION DATA

This application claims priority to U.S. Application Ser. No. 63/359,307, filed Jul. 8, 2022, which is incorporated in its entirety herein by reference.

FIELD OF THE INVENTION

The present invention relates to transport devices such as carts.

BACKGROUND OF THE INVENTION

A variety of transport aids or devices are known, such as to aid a user in moving objects. A common environment where a person may need assistance in transporting objects or materials is the yard or garden. In particular, yard and garden materials such as soil, sand, gravel and the like, are often very heavy and can't easily be transported by hand. Further, yard and garden waste, such as lawn and leaf clippings, tree trimmings and the like, are also difficult to transport.

Lawn tractors and other motorized devices are known for use in such tasks. However, that equipment is expensive to purchase and maintain, and generally requires a lot of storage space.

Homeowners thus often turn to non-motorized devices such as wheelbarrows and garden carts. Wheelbarrows are ancient and are frequently used to transport such materials. However, nearly all homeowners know that wheelbarrows are difficult to use due to their single wheel design. They are hard to control and often tip over, resulting in a spilling of their load. Further, they are difficult to dump, requiring that the user have sufficient strength to raise the wheelbarrow to a pirouette at its front in order to completely dump its contents.

Other wheeled transport aids are known, such as two and four wheeled carts. These carts also generally suffer from various disadvantages, such as being heavy, hard to dump, hard to turn or the like. Thus, an improved utility cart is desired.

SUMMARY OF THE INVENTION

Aspects of the invention comprise a utility cart, and methods of manufacturing, assembling and using a utility cart.

In one embodiment, a utility cart comprises a frame, the frame having a front and a rear, the rear comprising a first side spaced from a second side by a first distance, first and second front wheels mounted for rotation relative to the frame about a front wheel axis, first and second rear wheels mounted for rotation relative to the frame about a rear wheel axis, a bed rotatably mounted about a pivot axis to the frame, the bed rotatable between a transport position in which the bed extends generally parallel to the frame and a dumping position in which the bed extends at an angle to the frame, the pivot axis being located between the front wheel axis and the rear wheel axis, and wherein the second distance is less than the first distance, whereby when the bed is moved to the dumping position at least a portion of the bed is located between the first side and the second side of the rear of the frame.

In one embodiment, the front wheels may be mounted to an axle beam which is rotatably connected to the frame. A tongue may be connected to the axle beam, permitting the cart to be pulled and steered.

Additional aspects of the invention comprise methods of making/assembling and using a utility cart.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a utility cart. Other aspects of the invention comprise methods of making, assembling and using such a cart.

Figures 1, 2:
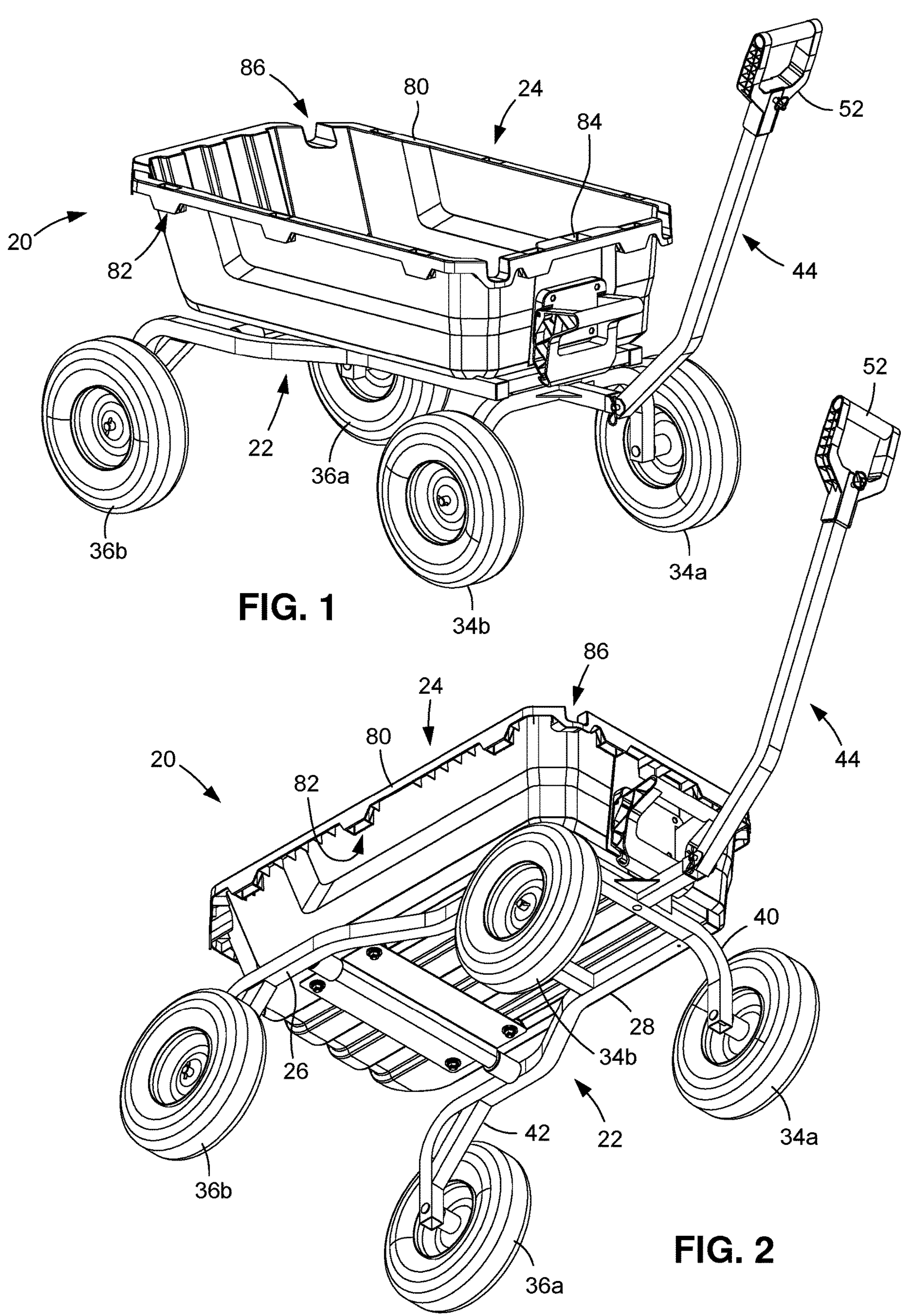
FIG. 1 is a top perspective view of a utility cart in accordance with an embodiment of the invention.
FIG. 2 is a bottom perspective view of the cart illustrated in FIG. 1.

One embodiment of a utility cart 20 is illustrated in FIGS. 1 and 2. As illustrated therein, the cart 20 comprises a frame 22 which supports a bed 24. The cart 20 may generally have a front end, such as at which a tongue is located (described in more detail below), an opposing rear, and a first side and a second side.

Figure 3:
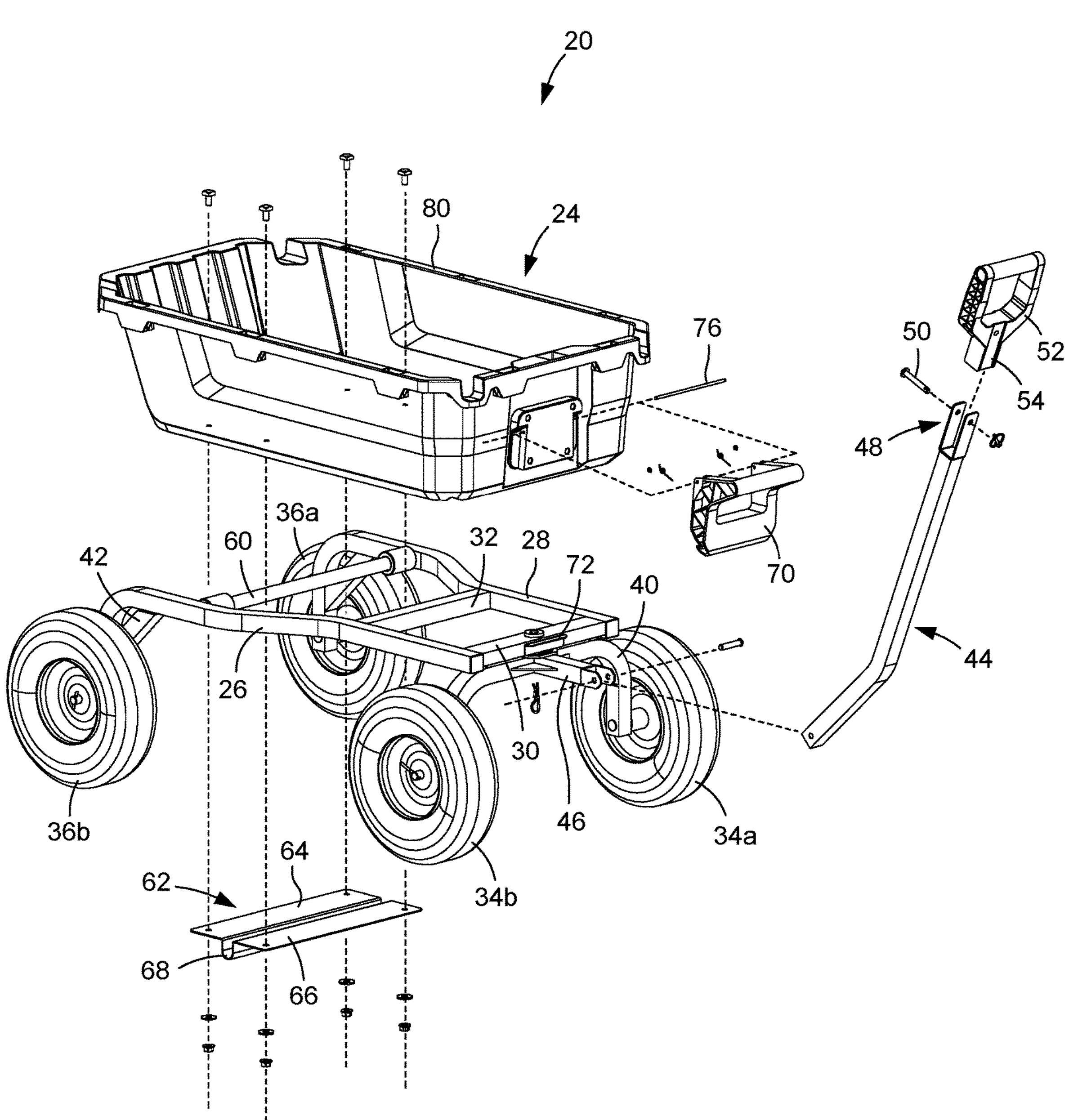
FIG. 3 is an exploded view of the cart illustrated in FIG. 1.

As illustrated in FIG. 3, the frame 22 may be constructed of a number of supports or supporting elements. For example, the frame 22 may comprise a first side rail 26 and a second side rail 28. The first and second side rails 26,28 may be connected by one or more cross-supports or struts, such as a first strut 30 and a second strut 32. The first strut 30 may be generally located at the front of the frame 22, while the second strut 32 may be located rearwardly from the first strut 30. The first and second struts 30,32 aid in maintaining the first and second side rails 26,28 in a spaced apart position, and contribute to the rigidity of the frame 22.

In one embodiment, the frame 22 is rollably supported. In one embodiment, the frame 22 is supported by a pair of front wheels 34*a,b* and a rear pair of wheels 36*a,b*. In order to permit a user to steer the front wheels 34*a,b*, the front wheels may be mounted to an axle beam 40. The axle beam 40 may have a generally inverted "U" shape, with the front wheels 34*a,b* rotatably connected to the opposing downwardly extending sides thereof. A central portion of the axle beam 40 is preferably pivotally connected to the frame 22, such as the front frame strut 30, thus permitting the axle beam 40, and thus the front wheels 34*a,b*, to pivot or turn relative to the frame 22.

The rear wheels 36*a,b* may be rotatably connected to the first and second side rails 26,28. As illustrated, a rear portion of each of the first and second side rails 26,28 may extend or bend from a generally horizontal orientation to a generally vertical orientation, thus defining a mounting portion for each rear wheels 36*a,b*. In one embodiment, a brace 42 may extend from the generally horizontal portion of each side rail 26,28 to the generally vertical section, such as to provide additional load support thereto.

In order to facilitate pulling or towing of the cart 20, a tongue 44 may be connected thereto. In one embodiment, the tongue 44 is connected to the axle beam 40, thus permitting the rotational orientation of the axle beam 40 to be changed (by applying a side-to-side steering force thereto). In one embodiment, as illustrated in FIG. 3, a first end of the tongue 44 is connected to the axle beam 40, such as to a forwardly extending extension 46. The tongue 44 is preferably pivotally connected, such as about a horizontal axis which permits the tongue 44 to be raised and lowered (but which transmits side to side or steering forces). In one embodiment, the axle beam 40 is configured to rotate about a vertically extending steering axles, while the tongue 44 rotates about a horizontally extending axis.

In one configuration, a second end of the tongue 44 generally defines a clevis type connector 48. This connector 48 may comprise spaced apart flanges (such as spaced top and bottom flanges). The connector 48 may be connected to, for example, a hitch of a motorized vehicle, such as by a pin 50, thus permitting the cart 20 to be towed. Alternatively, a handle 52 may be connected thereto. As illustrated, the handle 52 may comprise a base portion with upper and lower slots 54 for accepting the flanges of the connector 48. The handle 52 may be secured to the connector 48 via the pin 50 (or, as described below, be removed and stored, such as when the connector 48 is connected to a motorized vehicle or the like).

In general, the bed 24 is supported by the frame 22, such as being located on top thereof. In this configuration, the bed 24 is supported in an elevated position and is movable with the frame 22.

The bed 24 may be generally flat. However, in a preferred embodiment, the bed 24 has one or more sides, such as a bottom and at least one wall that extends upwardly around the perimeter thereof at the front, rear and opposing sides thereof. A top of the bed 24 is generally open. In this manner, the bed 24 generally has the configuration of a bin.

As illustrated, the wall at the front and sides of the bed 24 may be generally vertically extending (at approximately 90 degrees from the bottom), while the wall at the rear of the bed 24 may be sloped.

In a preferred configuration, the bed 24 is movably mounted to the frame 22, so as to be a "dumping" style bed 24. In one embodiment, as illustrated in FIG. 3, the frame 22 supports a pivot rod 60. The pivot rod 60 may extend between the first and second frame rails 26,28, such as between the front and rear wheels 34,36 thereof. The bed 24 may be connected to a sleeve 62 which pivots around the pivot rod 60. The sleeve 62 may, as illustrated, have first and second flange portions 64,66 on either side of a slot 68. The first and second flange portions 64,66 may be secured to the bottom of the bed 24, such as with fasteners, with the pivot rod 60 trapped between the bed 24 and the slot 68 of the sleeve 62.

Figure 8:
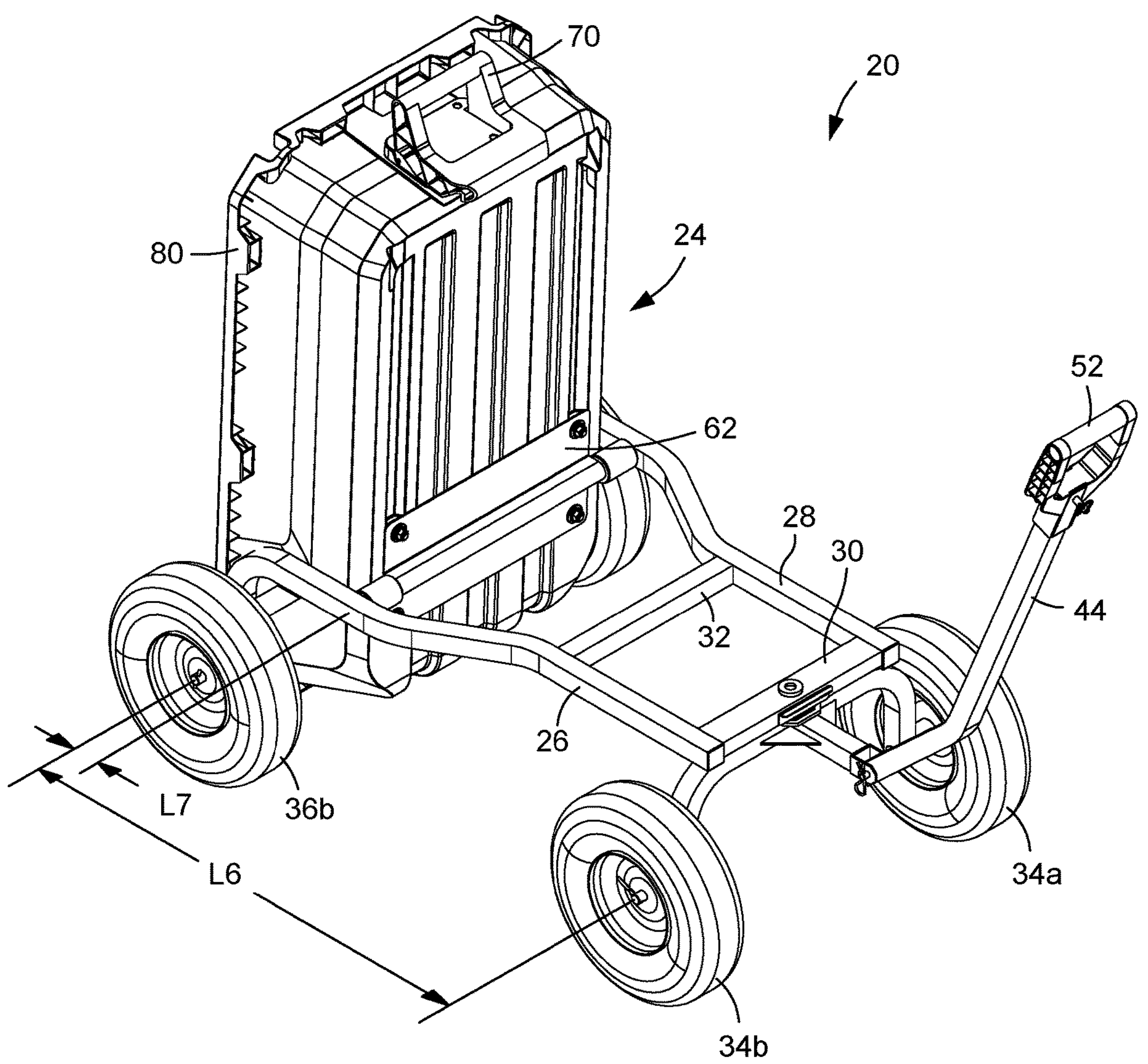
FIGS. 8-10 are a front perspective view, side view and rear perspective view of the cart illustrated in FIG. 5, as moved to a full dumping position.
Figure 10:
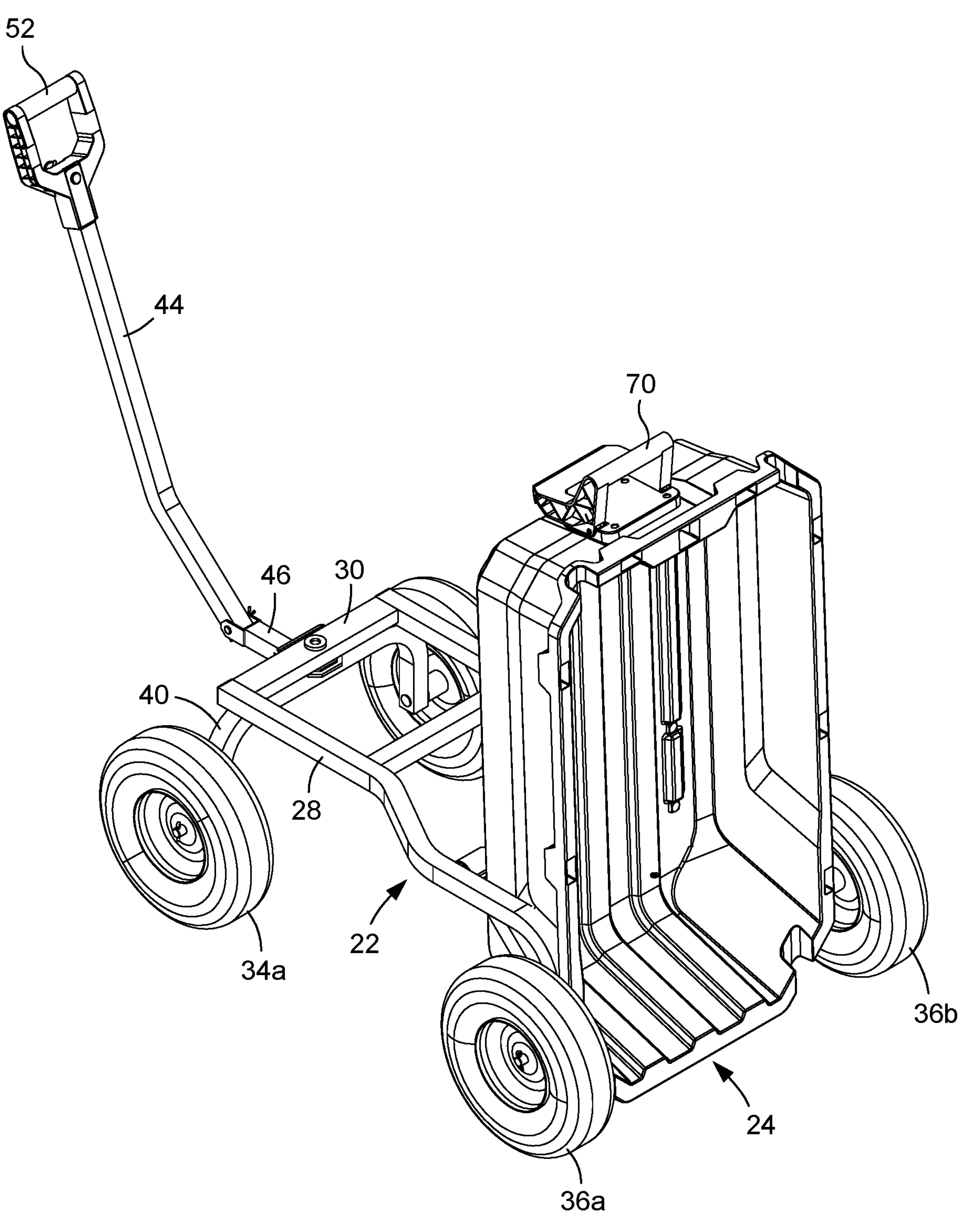

As best illustrated in FIGS. 1 and 2, the bed 24 can be moved from a generally horizontal position (where the bottom of the bed is generally horizontal when the wheels 34,36 are on a generally horizontal surface) to a generally vertical position, as illustrated in FIGS. 8 and 10. As illustrated, to facilitate movement of the bed 24 to the vertical position, a rear portion of the first and second side rails 26,28 are spaced wider than a width of the bed 24, thus allowing the bed 24 to be moved to a position in which is positioned between the first and second side rails 26,28.

Figure 4:
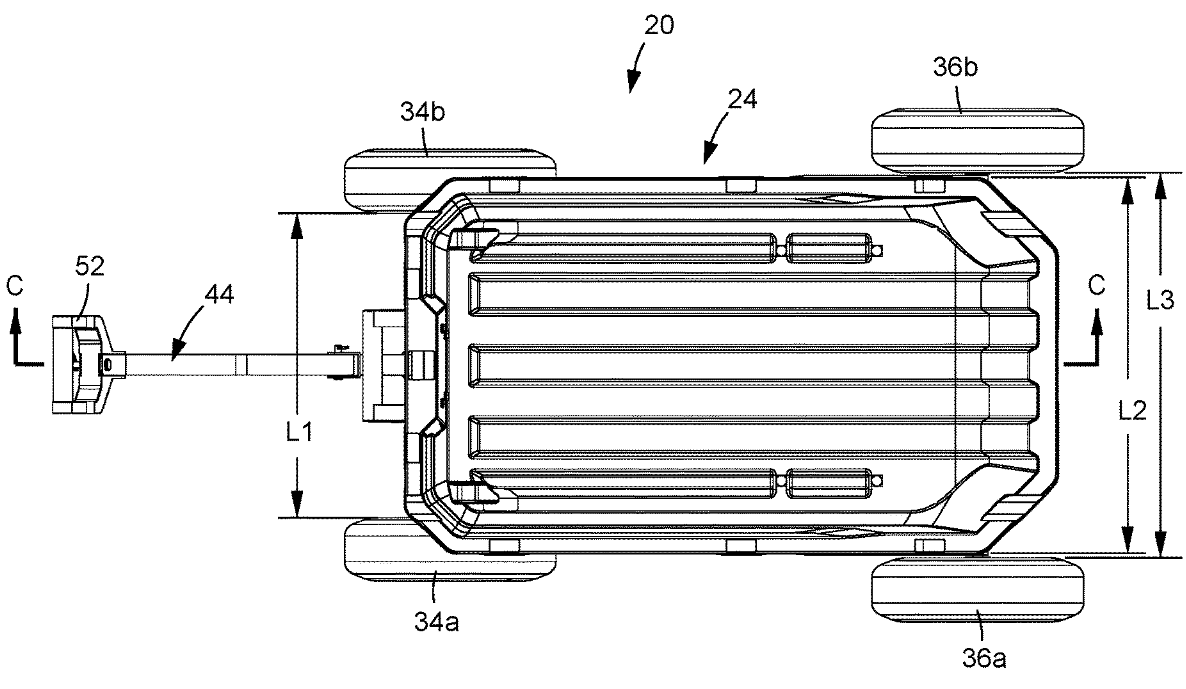
FIG. 4 is a top view of the cart illustrated in FIG. 1.

In a preferred embodiment, the width of the frame 22 at the front of the cart 20 is thus smaller (narrower) than a width of the frame 22 at the rear of the cart 22. Further, the axle mount 40 may have a width which is less than a distance between the rear portions of the first and second side rails 26,28, thus causing the front wheels 34*a,b* to be spaced apart by a distance which is less than a distance of the rear wheels 36*a,b*. For example, as illustrated in FIG. 4, a distance L1 between the front wheels 34*a,b* may be about 14.99 inches and a distance L2 between the rear wheels 36*a,b* may be about 22.67 inches (e.g. greater than the distance between the front wheels). Further a width L3 of the bed 24 may be about 21.75 inches, whereby the distance between the rear wheels 36*a,b* is at least slightly greater than the width of the bed 24. Of course, these dimensions may depend upon the size of the cart 20, including the size of the bed 24. For example, the dimensions noted above may be for a cart 22 where the bed 24 is configured as a 4 cubic foot bed. However, the cart 22 might have other configurations, such as where the bed 24 is configured as a 7 cubic foot bed (wherein the sizes are roughly related to the maximum volume of material which may be carried by the bed when it is stacked full). In that example, the distance L1 between the front wheels 34*a,b* may be about 18.74 inches and the distance L2 between the rear wheels 36*a,b* may be about 23.77 inches (e.g. greater than the distance between the front wheels). Further the width L3 of the bed 24 may be about 23.54 inches, whereby the distance between the rear wheels 36*a,b* is at least slightly greater than the width of the bed 24

In order to facilitate a user's movement of the bed 24 from its horizontal or "transport" position to its generally vertical or "dumping" position, a handle 70 may be provided. Further, a latch or similar element may be used to retain the bed 24 in its transport position until a user is ready to move it to its dumping position. In one embodiment, the handle 70 may actuate that latch or form a portion of that latch. For example, as illustrated, the handle 70 may be movably, such as pivotally via a pin 76, mounted to the bed 24. A bottom portion of the handle 70 may define a catch for selectively engaging a tab 74 on the frame 24. Upward force applied to the handle 70 may cause the catch to rotate out of engagement with the tab 74, thus releasing the bed 24 and allowing the user to then rotate the bed to its dumping position.

The cart 20 may have additional features.

For example, as illustrated in FIG. 1, a top of the bed wall may define a rim 80. In one embodiment, the rim 80 may define one or more openings therein. For example, the rim 80 may define one or more first openings 82, such as located at the side walls and/or front wall, such as for accepting a stake or post, such as which may extend upwardly above the rim 80, such as for securing taller loads. The rim 80 may define a second opening 84, such as at the front wall of the bed 24, such as for accepting the base of the tongue handle 52 when the tongue handle is disconnected from the tongue 44 and is not in use. The rim 80 may also define one more slots 86, such as in the front and rear walls in alignment with one another. These slots 86 may, for example, accept long handled tools or other features therein.

Figure 5:
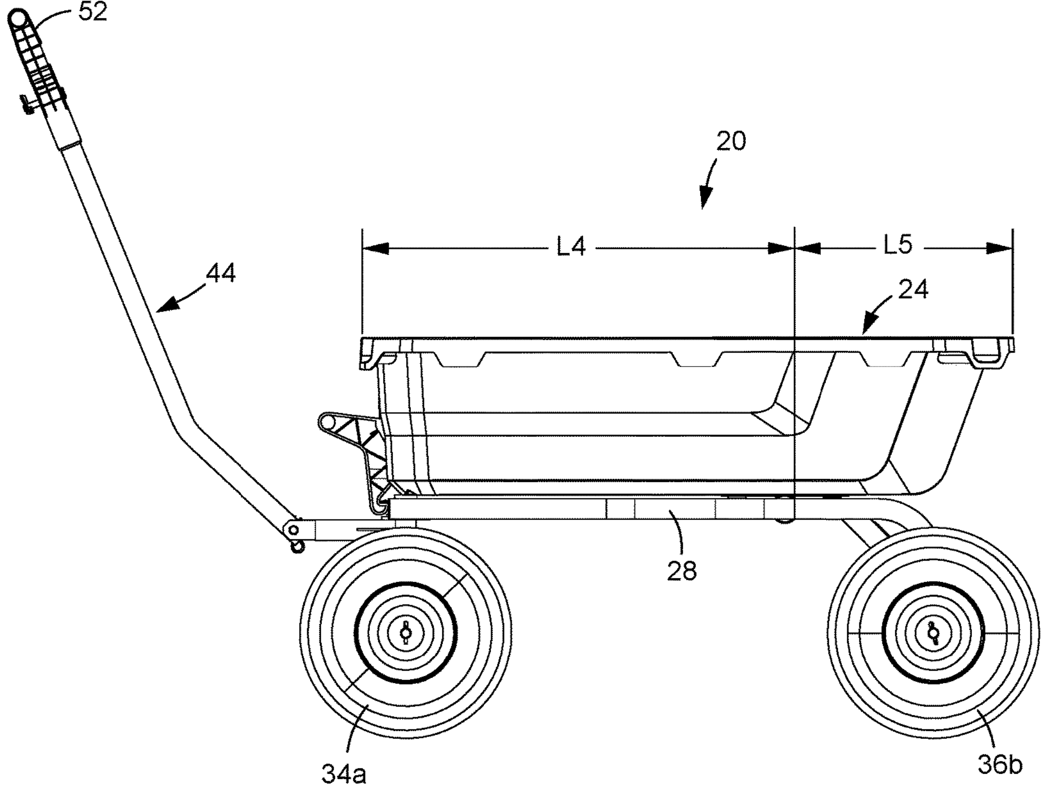
FIG. 5 is a side view of the cart illustrated in FIG. 1.

Use of the cart 20 will now be described. As illustrated in FIG. 5, the cart 20 may be used in a transport position where the bed 24 is generally horizontal and resting upon the frame 22 (the bed 24 thus being in a plane which extends generally parallel to a plan containing the frame 22, but located above the frame). A user may pull the cart 20, including steering it, by grasping the handle 52. Alternatively, the user may disconnect the handle 52 and store it by placing it in the handle opening 84 of the bed. The user can then connect the tongue 44 to other objects, such as a tractor hitch or the like.

Figures 6, 7:
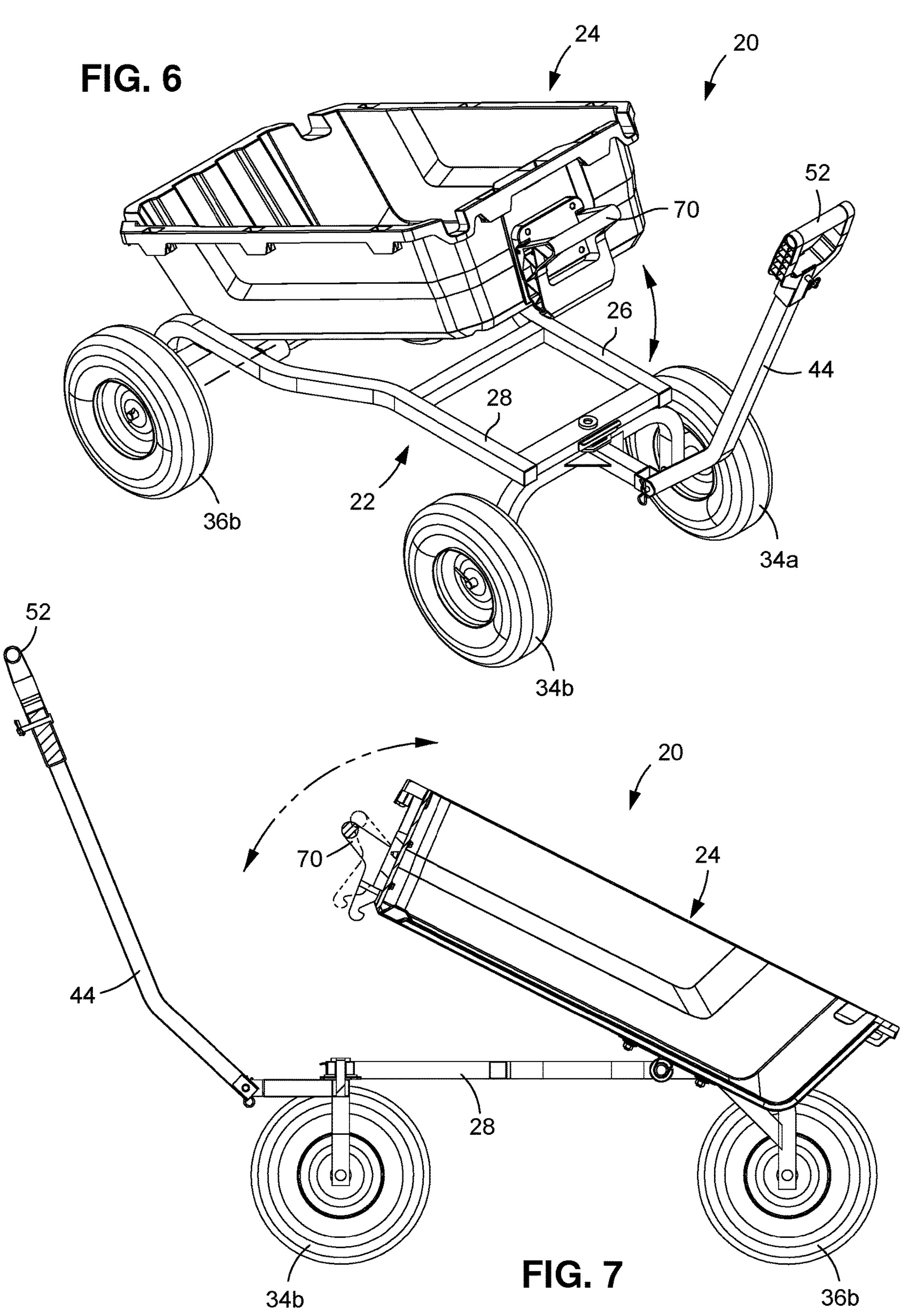
FIGS. 6 and 7 are top perspective and side views of the cart illustrated in FIG. 5, as moved to a partial dumping position.

As illustrated in FIGS. 6 and 7, the user can also release the front of the bed 24 from the frame 22, such as by actuating the handle 70. This allows the front of the bed 24 to be lifted upwardly.

Figure 9:
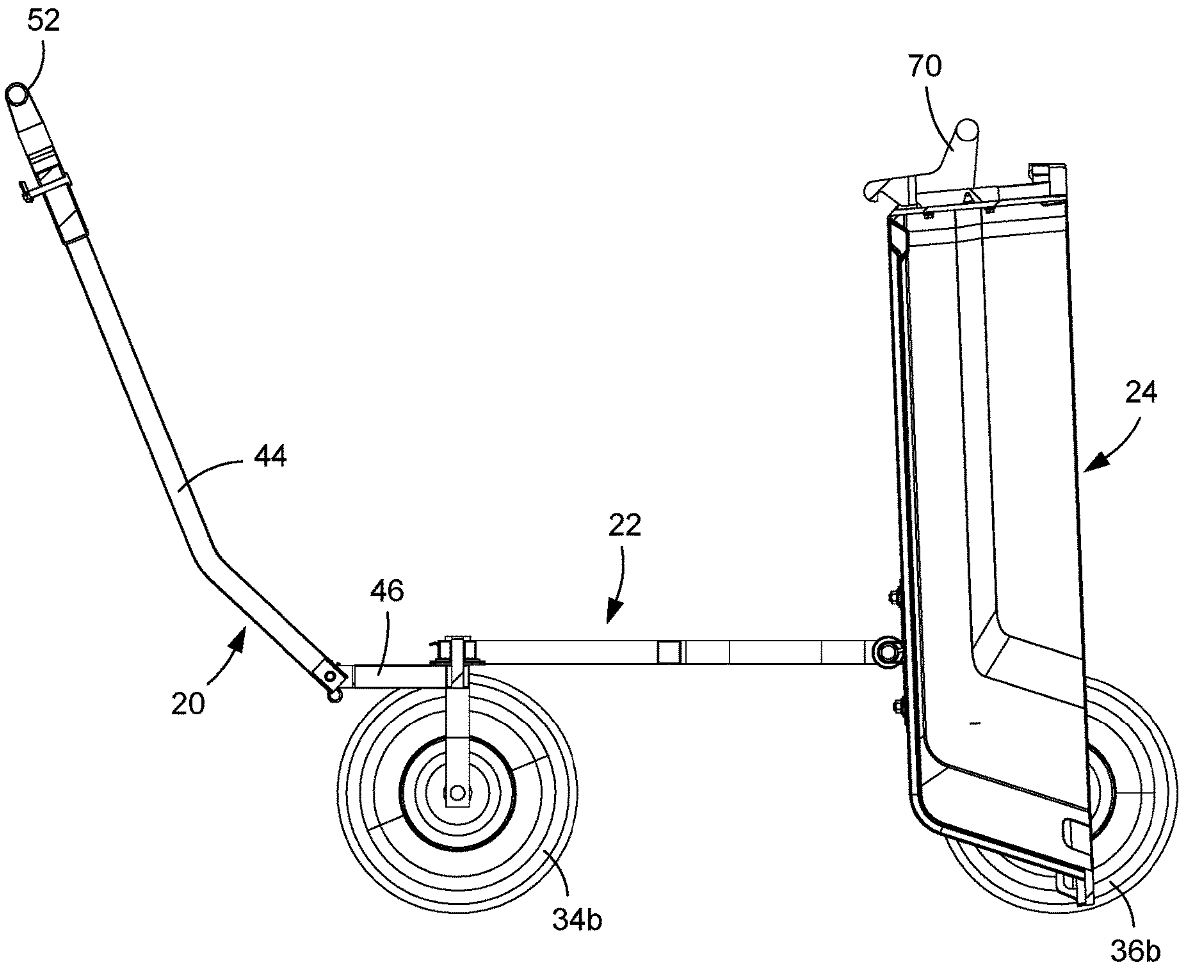

As illustrated in FIGS. 8 and 9, the user can move the bed 24 to a generally vertical position, e.g., wherein the bed 24 is located in a plane which is generally perpendicular to the frame 22. In this position, at least a portion of the bed 24 that was positioned above the frame 22 when the bed 24 was in the transport position is then positioned between the two rear wheels 36*a,b*, due to the width of the frame 22 (between the first and second frame rails 26,28) at that location. Further, the rear of the bed 24 is moved from a position in which it is located above the frame 24, to a position in which it is located below the frame 24. In this position, the rim 80 of the bed 24 at the rear of the bed 24 may be located close to or in contact with, the ground. At the same time, the front of the bed 24, which was originally located above the frame 22 by a first distance, is raised to a position in which it is located above the frame 22 by a second distance (which is greater than the first distance).

The cart 20 has a number of advantages.

One advantage of the cart 20 is that it is very stable, including by being less prone to rolling. This is due to the increased width of the frame 22 at the rear and the increased spacing of the rear wheels 36*a,b*. As indicated, this spacing causes the rear wheels 36*a,b* to be spaced apart by a distance which is greater than the width of the bed 24. This provides substantially increased lateral cart stability.

Another advantage to the cart 20 is that it is easy to move from its transport position to its dumping position. The amount of force which it takes to dump the cart 20 is greatly reduced due to a mechanical advantage which is realized by the pivot location of the bed 24. In particular, as indicated above and as illustrated in FIG. 5, the bed 24 is configured to pivot about an axis that is between its front and rear ends. In one embodiment, such as for a cart 22 having a 4cf bed 24, the pivot axis is about L4=23.65 inches from the front of the bed 24, and about L5=11.02 inches from the rear of the bed 24, and for a 7cf bed, L4=26.38 inches and L5=14.36 inches. In other words, the pivot location is not in the middle or at the rear of the bed 24, but is about 60-70% of the distance between the front and rear ends (towards the rear) thereof. As indicated, this pivot location is uniquely permitted due to the fact that the bed 24 can be rotated between the rear portions of the frame 22 and the rear wheels 36*a,b*.

As illustrated in FIG. 9, a lateral distance L6 between the rotational axis of the front wheels 34*a,b* and the rear wheels 36*a,b* is about 26.36 inches, and a lateral distance L7 of the bed pivot axis to the axis of the rear wheels 36*a,b* is about 5.81 inches for a 4cf bed 24, and L6=32.48 inches and L7=9.15 inches. In one embodiment, the pivot axis is thus about 70-80% of the distance between the front and rear wheel axes (where the pivot axis is further towards the rear wheel axis). This configuration facilitates bed stability in the front to back direction of the cart 20.

In one embodiment, the frame 22, such as the one or more of the individual elements thereof, may be constructed from steeling tubing, such as square steel tubing. The portions of the frame 22 may be connected by welding, fasteners or the like. Of course, the frame 22 might be constructed from other materials, and via casting, etc.

In one embodiment, the bed 24 may be constructed of a durable polymer material, such as in a molding process. But the bed 24 might be constructed from metal and in other processes. The bed 24 may include ribbing or other features, such as to increase the rigidity thereof.

In one embodiment, the wheels may be inflatable rubber wheels. However, the wheels might be solid or have other configurations.

In one embodiment, each of the wheels is independently pivotally attached to the frame 22. However, the wheels might be pivotally or rotatably mounted in other manners. For example, the front wheels 34*a,b* might be rotatably mounted via a secondary axle which is supported by the main axle 40. This secondary axle might comprise a rod which is supported by the free ends of the main axle. Likewise, the rear wheels might be mounted to a rear axle which is supported by the downwardly extending portions of the first and second frame rails 26,28.

The frame 22 might also have other configurations, such as having additional supporting members, or having other configurations. For example, a front portion of the frame 22 might simply comprise a plate and the rear wheels might be supported by legs which extend rearwardly therefrom.

In one embodiment, the latch which maintains the bed 24 is part of the handle 70. However, the latch might be separate from the handle 70. In that event, the handle 70 might be integrated into the bed 24, in that may not be required to move.

It will be appreciated that features of the invention may be used independently of one another, and in conjunction with other devices or the like.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A utility cart comprising:

a frame, said frame comprising:

a first rail having a front end at a front portion and a rear end at a rear portion of said first rail, said rear end of said first rail located below said front end thereof; and a second rail having a front end at a front portion and a rear end at a rear portion, said rear end of said second rail located below said front end thereof;

said first and second rails spaced apart from one another by a first distance at said front portions thereof and said first and second rails spaced apart from one another by a second distance at said rear ends thereof, said second distance being greater than said first distance;

a first front wheel and a second front wheel mounted to an axle beam, said axle beam mounted for rotation relative to said frame, said first and second front wheels rotatable relative to said axle beam about a front wheel axis;

a first rear wheel rotatably mounted to said second end of said first rail and a second rear wheel rotatably mounted to said second end of said second rail, said first and second wheels rotatable about a rear wheel axis extending through said second ends of said first and second rails; and a bed rotatably mounted about a pivot axis to said frame, said bed having a bottom and first and second sides extending upwardly from said bottom, said bed rotatable between a transport position in which said bottom of said bed is located in a first plane which is generally parallel to a second plane containing said first and second rails at said front ends thereof and a dumping position in which said bottom of said bed extends at an angle to said first and second planes, said pivot axis being located at said rear portions of said first and second rails and between said front wheel axis and said rear wheel axis;

whereby when said bed is moved to said dumping position a portion of said bed is located between said first and second rails with said rear portion of said first rail extending adjacent to said first side of said bed and said rear portion of said second rail extending adjacent to said second side of said bed.

2. The utility cart in accordance with claim 1, wherein said angle is approximately 90 degrees.

3. The utility cart in accordance with claim 1, further comprising a tongue extending from said axle beam.

4. The utility cart in accordance with claim 1, wherein said first and second front wheels are spaced apart by a third distance and said first and second rear wheels are speed apart by a fourth distance.

5. The utility cart in accordance with claim 4, wherein said fourth distance is greater than said third distance and said fourth distance is greater than said second distance.

6. The utility cart in accordance with claim 1, wherein said bed has a front and a rear and said pivot axis is closer to said rear than said front of said bed.

7. The utility cart in accordance with claim 1, wherein said pivot axis is closer to said rear wheel axis than said front wheel axis.

8. The utility cart in accordance with claim 1, wherein a pivot rod extends between said first and second rails and extends along said pivot axis and a mounting flange is mounted to said bed and rotatably accepts said pivot rod.

9. The utility cart in accordance with claim 1, further comprising a latch configured to selectively connect said bed to said frame.

10. A utility cart comprising:

a frame having a front and a rear, said rear having a first side and a second side spaced apart by a first distance;

a steering axle rotatably mounted to said frame;

a first and a second front wheel mounted for rotation to said steering axle about a front wheel axis;

a first rear wheel mounted to said first side of said rear of said frame and a second rear wheel mounted to said second side of said rear of said frame, said first and second rear wheels mounted for rotation about a rear wheel axis;

a bed having a front, a rear, a first side, a second side, a bottom and a top rim, said bed rotatably mounted about a pivot axis to said frame, said bed rotatable between a transport position in which said bottom of said bed is located above said frame and a dumping position in which said first side of said frame extends parallel to said first side of said bed from said base towards said top rim and said second side of said frame extends parallel to said second side of said bed from said base towards said top rim, whereby a portion of said bed is located between said first and second sides of said rear of said frame and said rear of said bed is located below said frame; and a tongue, said tongue connected to said steering axle.

11. The utility cart in accordance with claim 10, wherein a handle is selectively coupled to said tongue, said bed having at least one aperture in said rim thereof for accepting a portion of said handle when said handle is not connected to said tongue.

12. The utility cart in accordance with claim 10, further comprising a latch, said latch movable between a first position in which said latch connects said front of said bed to said frame and a second position in which said front of said bed is disconnected from said frame.

13. The utility cart in accordance with claim 10, wherein said first and second front wheels are spaced apart by a first distance, said first and second rear wheels are speed apart by a second distance, said second distance greater than said first distance.

14. The utility cart in accordance with claim 10, wherein said first side of said frame comprises a non-linear first side rail having a first end and a second end, wherein said first rear wheel is mounted to said second end of said first side rail, wherein said second side of said frame comprises a non-linear second side rail having a first end and a second end, and wherein said second rear wheel is mounted to said second end of said second side rail.

15. The utility cart in accordance with claim 10, wherein said first and second sides are spaced apart by a first distance at said front end of said frame and are spaced apart by a second distance at said rear end of said frame, said second distance being greater than said first distance.

* * * * *